UNITED STATES PATENT OFFICE.

WALTER S. ROCKEY AND HILLIARY ELDRIDGE, OF NEW YORK, N. Y.

PROCESS OF REFINING COPPER.

978,212.

Specification of Letters Patent. Patented Dec. 13, 1910.

No Drawing. Application filed September 12, 1910. Serial No. 581,648.

*To all whom it may concern:*

Be it known that we, WALTER S. ROCKEY and HILLIARY ELDRIDGE, citizens of the United States, and both residing at New York city, in the county of New York and State of New York, have invented certain new and useful Improvements in Processes of Refining Copper, of which the following is a full, clear, and exact specification.

Our invention relates to the process of refining copper and the object of our invention is to purify copper by a new process.

The copper we preferably purpose to treat is known as cathode copper which is formed electrically but we do not limit the refining to this class of copper alone, but can refine other grades.

Our method consists in fusing and refining cathode copper under a flux which is composed of boron trioxid or of boron trioxid and silica; the silica is used to satisfy and prevent the action of boron trioxid on the silica of the hearth or crucible that may be used, and the reduction of the surface and contained oxids of the copper or other elements which dissolve or are held in suspension in the flux, which are consummated by the contained impurities of the cathode copper.

In carrying out our process, we prepare a molten bath of flux of boron trioxid or of boron trioxid and silica in case the crucible or hearth should contain any silica, to satisfy and prevent the action of the boron trioxid on the silica of the hearth or crucible that may be used. We also make provision for condensing the boron trioxid should it be vehicled out of the hearth or crucible by the furnace gases passing over it while in a molten state. We prefer to use a hearth or crucible constructed of neutral material such for illustration as magnesite. After this bath of flux is prepared we add the copper and as the metal fuses, the surface and the contained oxids of the metal dissolve in the bath of flux and the other impurities which are evolved from the bath of metal by the process of fusion, reduce the dissolved oxids in the order of their affinities. For illustration, taking cathode copper as an example, this contains notably occluded and surface hydrogen which is evolved by electrolytic action and is absorbed by the cathode copper as the process of electrolytic deposition of copper proceeds in the manufacture. There is also present a percentage of hydrocarbon which owes its presence to the oiling of the cathode plates by the electrolytic operators. In the refining of very impure copper more of this hydro-carbon oil could be added to assist its reduction. This occluded and contained hydrogen as it is evolved from the molten metal combines with the oxygen of the dissolved copper oxid or other oxids, freeing metal which is precipitated, and forming water $H_2O$ which passes off as vapor while the hydrocarbon which is decomposed by heat and breaking up into hydrogen and carbon performs a double decomposing function, the hydrogen reacting as above described, and the carbon combining with the oxygen of a portion of the dissolved copper oxid or other oxids that may be present frees metallic copper, which is precipitated, and forms carbon monoxid $CO$ and carbon dioxid $CO_2$ which pass off in a gaseous state. In addition to these reactions, other contained impurities, metallic and non-metallic elements which may be contained in the fused copper, such as iron, arsenic, antimony, silver, etc. react upon the dissolved or suspended copper oxid or other oxids that may be present or upon each other's oxids, sulfids or chlorids in the order of their affinities forming gases or vapors which would pass off or forming oxids which would dissolve or be held in suspension in the flux, thus refining and purifying the copper. Most of these reactions are made possible by reason of the exclusion of the atmosphere and the dissolving and suspensory properties of the flux, boron trioxid $B_2O_3$. The above described reactions would also apply to the purification and refining of copper matte before electrolyzing and also the refining of ordinary commercial copper.

Having thus described our invention what we claim as new is:

1. The process of refining copper consisting in providing a suitable crucible or hearth and placing therein a predetermined quantity of boron trioxid and fusing same by heat to form a bath, then adding the copper to be refined and fusing same in said bath of flux until the oxids and other impurities contained by said metal are reduced or eliminated, and then cooling said copper beneath said flux to prevent oxidation and absorption of gases during the cooling period.

2. The process of refining cathode copper consisting in providing a suitable crucible or hearth such for illustration as magnesite and placing therein a predetermined quantity of boron trioxid and fusing said boron trioxid by heat, then adding a sufficient quantity of silica to neutralize the action of the boron trioxid on the silica that may be contained in the crucible or hearth and then adding the copper to said flux and fusing and heating the same therein until the oxids, gases and other impurities contained in said metal are reduced or eliminated.

3. The process of refining cathode copper consisting in providing a suitable crucible or hearth such for illustration as magnesite and placing therein a predetermined quantity of boron trioxid and fusing said boron trioxid by heat, then adding a sufficient quantity of silica to neutralize the action of the boron trioxid that may be contained in the crucible or hearth, then adding the copper to said flux and fusing and heating same therein until the oxids, gases and other impurities contained in said metal are reduced or eliminated from the copper, and then cooling said metal beneath said flux to prevent oxidation during the cooling period.

4. The process of refining cathode copper, consisting in providing a suitable crucible or hearth which is constructed of material refractory to heat and neutral to the flux employed, such for illustration as magnesite, and placing therein a predetermined quantity of boron trioxid and fusing the said boron trioxid by heat and then adding cathode copper to said fused flux of boron trioxid and fusing and heating the said cathode copper therein until the contained oxids of the cathode copper are reduced by the reaction of the contained hydrogen, hydrocarbon and other impurities that may be present in the said cathode copper and the gases and other impurities are eliminated from the said cathode copper, substantially as described.

5. The process of refining copper consisting in providing a suitable crucible or hearth which is constructed of material refractory to heat and neutral to the flux employed, such for illustration as magnesite, and placing therein a predetermined quantity of boron trioxid, and fusing the said boron trioxid by heat and then adding copper which has been previously immersed in a hydro-carbon oil to said fused flux of boron trioxid and fusing and heating the said copper therein until the surface and contained oxids of the copper are reduced by the reaction of the contained hydrogen of the copper and the hydrogen and carbon of the decomposable hydro-carbon oil that had been added with the copper substantially as described.

6. The process of purifying copper matte of surface or contained oxids, sulfids, chlorids and gases consisting in providing a suitable crucible or hearth, which is constructed of material refractory to heat and neutral to the flux employed, such for illustration as magnesite and placing therein a predetermined quantity of boron trioxid and fusing the said boron trioxid by heat and then adding copper matte that has previously been immersed in a hydro-carbon oil to said fused flux of boron trioxid and fusing and heating the said copper matte therein until the surface or contained oxids are reduced by the hydrogen of the copper and the hydrogen and carbon of the decomposable hydro-carbon oil that is present, and the sulfids, chlorids and gases are eliminated from the copper matte or are dissolved in the flux or are expelled therefrom.

7. The process of refining impure copper consisting in providing a suitable crucible or hearth which is constructed of material refractory to heat and neutral to the flux employed such for illustration as magnesite and placing therein a predetermined quantity of boron trioxid ($B_2O_3$) and fusing the said boron trioxid by heat and then adding copper to said fused flux of boron trioxid, and then introducing a hydro-carbon into said flux, and then fusing and heating the said copper in said flux until the contained oxids of the copper are reduced by the contained hydrogen of the copper and the hydrogen and carbon of the decomposable hydro-carbon that has been added, substantially as described.

In testimony whereof, we affix our signatures in presence of two witnesses.

WALTER S. ROCKEY.
HILLIARY ELDRIDGE.

Witnesses:
FRANK C. PLUME,
G. F. QUACKINBUSH.